(12) United States Patent
Tublin et al.

(10) Patent No.: US 9,747,595 B1
(45) Date of Patent: Aug. 29, 2017

(54) READYING CUSTOMER DATA BASED ON GEO-LOCATION

(75) Inventors: Bryan Kyle Tublin, San Francisco, CA (US); Jeffrey M. Wolfe, Parrish, FL (US); Eddie James Lucero, Little Elm, TX (US); Phillip J. Ohme, San Diego, CA (US); Fielding B. Wilson, Clayton, NC (US); Robert Milo Keathley, The Hills, TX (US)

(73) Assignee: Intuit Inc., Mountain View, CA (US)

( * ) Notice: Subject to any disclaimer, the term of this patent is extended or adjusted under 35 U.S.C. 154(b) by 922 days.

(21) Appl. No.: 13/601,624

(22) Filed: Aug. 31, 2012

(51) Int. Cl.
| | |
|---|---|
| G06Q 20/32 | (2012.01) |
| G06Q 50/00 | (2012.01) |
| G06F 17/30 | (2006.01) |
| G06Q 30/02 | (2012.01) |

(52) U.S. Cl.
CPC ........... *G06Q 20/32* (2013.01); *G06Q 20/325* (2013.01); *G06Q 30/0261* (2013.01)

(58) Field of Classification Search
USPC ....................................................... 705/346
See application file for complete search history.

(56) References Cited

U.S. PATENT DOCUMENTS

| | | | |
|---|---|---|---|
| 6,446,004 B1* | 9/2002 | Cao ..................... | G06F 9/445 701/482 |
| 6,542,750 B2* | 4/2003 | Hendrey et al. ........... | 455/456.1 |
| 7,716,094 B1* | 5/2010 | Sutter .................... | G06Q 20/14 705/30 |
| 8,583,517 B1* | 11/2013 | Ohme .................. | G06Q 20/207 705/30 |
| 2011/0045801 A1* | 2/2011 | Parker, II .......... | H04M 1/72538 455/411 |
| 2013/0324056 A1* | 12/2013 | Maguire ................ | H01Q 1/245 455/73 |
| 2013/0339358 A1* | 12/2013 | Huibers et al. ................ | 707/737 |
| 2014/0250191 A1* | 9/2014 | Altman et al. ................ | 709/204 |

* cited by examiner

*Primary Examiner* — Mark A Fleischer
(74) *Attorney, Agent, or Firm* — Osha Liang LLP

(57) ABSTRACT

In one embodiment, the invention involves a method for readying client financial data. The method comprises receiving a proximity distance; identifying a location of a mobile device of a financial professional (FP); identifying a location of a first client of the FP within the proximity distance from the location of the mobile device; downloading, by the mobile device and in response to identifying the first client, a first financial data item corresponding to the first client; and displaying, to the FP by the mobile device, the first financial data item.

19 Claims, 5 Drawing Sheets

READYING CUSTOMER DATA BASED ON GEO-LOCATION

SUMMARY

In general, in one aspect, the invention relates to a method for readying client financial data. The method comprises receiving a proximity distance; identifying a location of a mobile device of a financial professional (FP); identifying a location of a first client of the FP within the proximity distance from the location of the mobile device; downloading, by the mobile device and in response to identifying the first client, a first financial data item corresponding to the first client; and displaying, to the FP by the mobile device, the first financial data item.

In general, in one aspect, the invention relates to a system for readying client financial data. The system comprises a mobile device of a financial professional (FP); and a financial application executing on the mobile device of the FP and configured to: receive a proximity distance; identify a location of the mobile device of the FP; identify a location of a first client of the FP within the proximity distance from the location of the mobile device; download, in response to identifying the first client, a first financial data item corresponding to the first client; and display, to the FP, the first financial data.

In general, in one aspect, the invention relates to a non-transitory computer readable medium storing instructions for readying client financial data. The instructions comprise functionality to receive a proximity distance; identify a location a mobile device of a FP; identify a location of a first client of the FP within the proximity distance from the location of the mobile device; download, in response to identifying the location of the first client, a first financial data item corresponding to the first client; and display, to the FP, the first financial data.

Other aspects of the invention will be apparent from the following description and the appended claims.

DETAILED DESCRIPTION

Figure 1A:
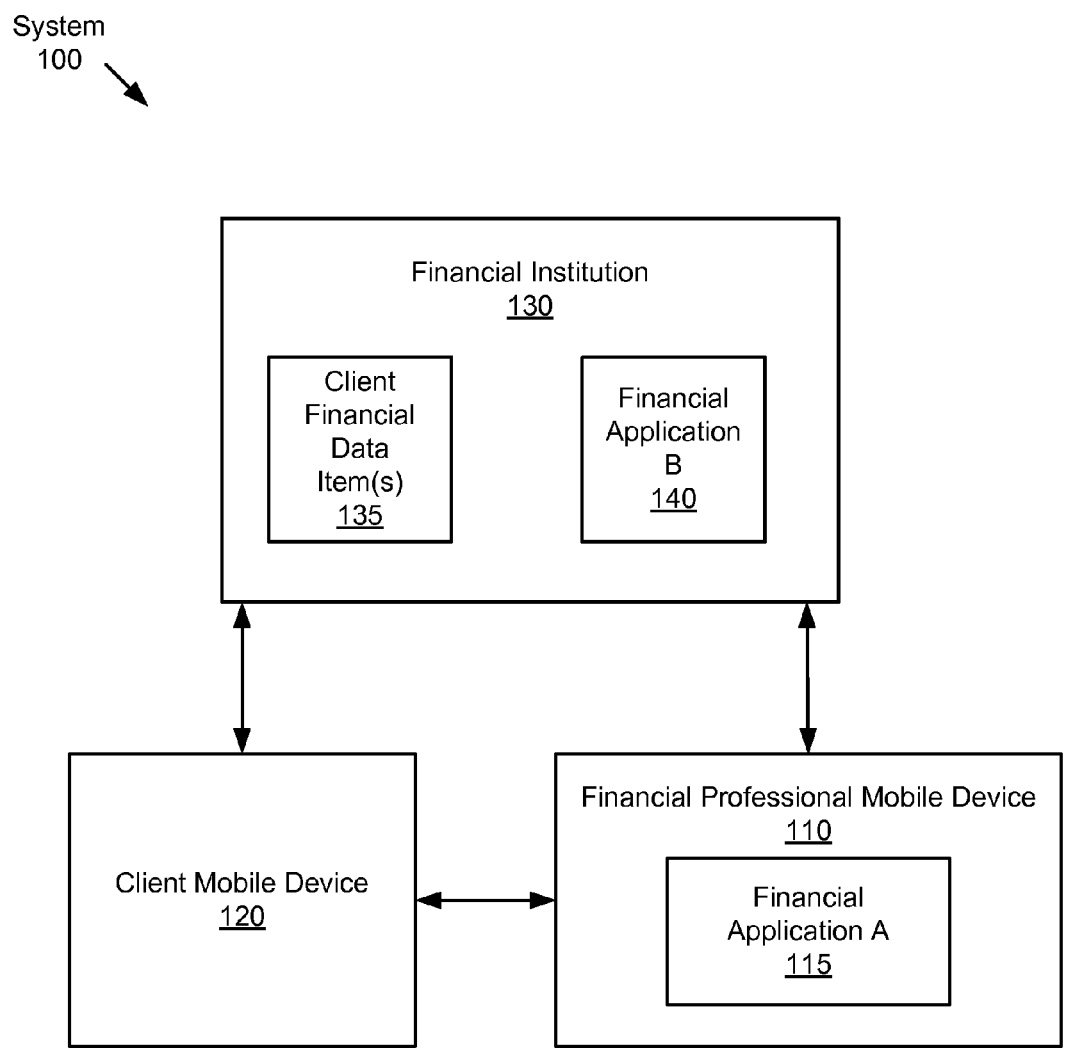
FIG. 1A shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more through understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for readying customer data based on geo-location. Specifically, when a client of a financial professional (FP) is identified within a predetermined distance of the FP's mobile device, one or more financial data items for that client are preemptively downloaded to the FP's mobile device. The one or more financial data items may be needed by the FP prior to or during an in-person meeting with the client.

FIG. 1A shows a system (100) in accordance with one or more embodiments of the invention. As shown in FIG. 1A, System (100) includes FP Mobile Device (110), Financial Application A (115), Client Mobile Device (120), Financial Institution (130), Client Financial Data Item(s) (135), and Financial Application B (140). The components of the system may be located on the same device (e.g., a server, mainframe, desktop personal computer (PC), laptop, Personal Digital Assistant (PDA), telephone, mobile phone, kiosk, cable box, or any other device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

Figure 1B:
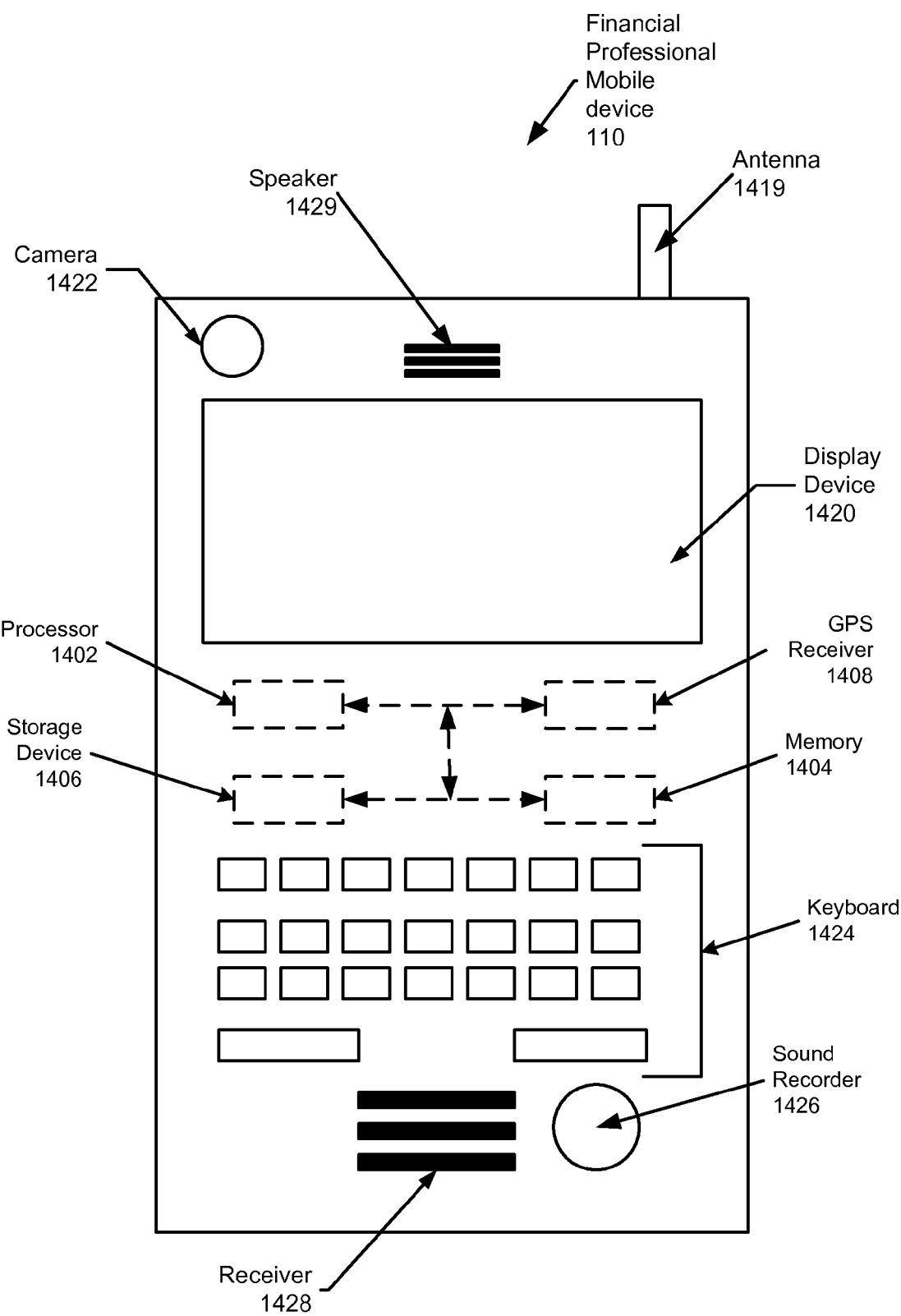
FIG. 1B shows a mobile device in accordance with one or more embodiments of the invention.

In one or more embodiments of the invention, FP Mobile Device (110) is a mobile device of a FP, such as an accountant, tax attorney, a stock broker, or other professional. FIG. 1B shows FP Mobile Device (110) in detail, in accordance with one or more embodiments of the invention. Turning to FIG. 1B, in one or more embodiments of the invention, the FP Mobile Device (110) is a portable device that provides a user interface. Examples of mobile devices may include, but are not limited to, cellular phones, personal digital assistants, personal communicators, pagers, smart phones, or any other computing device. In one or more embodiments of the invention, as shown in FIG. 1B, the FP Mobile Device (110) may include a Processor (1402), Memory (1404) (e.g., RAM, cache memory, flash memory, etc.), a Storage device (1406) (e.g., a hard disk, an optical drive such as a compact disk drive or digital video disk (DVD) drive, a flash memory stick, etc.), a Global Positioning System (GPS) Receiver (1408), a Speaker (1429), a Receiver (1428), a Keyboard (1424), a Sound Recorder (1426), a Display Device (1420), a Camera (1422), and an Antenna (1419), and numerous other elements and functionalities typical of today's mobile devices (not shown).

FP Mobile Device (110) may include input means and output means, such as the Keyboard (1424), the Receiver (1428), and/or the Display Device (e.g., a liquid crystal display screen) (1420), which permits a user to enter and/or display keystrokes including numeric, alphabetic, and other characters, images, or other media types. Other input devices may include a Camera (1422), a Sound Recorder (1426), and/or other data recording mechanisms. Those skilled in the art will appreciate that these input and output means may take other forms now known or later developed.

FP Mobile Device (110) may be connected to a network (e.g., a local area network (LAN), a wide area network (WAN) such as the Internet, or any other similar type of network) via the Antenna (1419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from FP Mobile Device (110) with a mobile device identifier of the FP Mobile Device (110).

In one or more embodiments of the invention, the GPS Receiver (1408) includes functionality to obtain a location coordinate of the FP Mobile Device (110). FP Mobile Device (110) may be configured to use the GPS Receiver (1408) to provide latitude and longitude location coordinates.

Returning to FIG. 1A, FP Mobile Device (110) may be communicatively connected to Client Mobile Device (120) and/or Financial Institution (130). In one or more embodiments of the invention, this connection may be wireless. Any wireless protocol may be used, in accordance with the various embodiments of the invention. Examples of a wireless protocol may include, but are not limited to Bluetooth®, 802.11, and Near Field Communication (NFC). Bluetooth is a registered trademark owned by Bluetooth SIG, Inc. Alternatively, a wired connection may be used.

In one or more embodiments of the invention, FP Mobile Device (110) includes Financial Application A (115). Financial Application A (115) may be installed by the user of FP Mobile Device (110), or may come pre-installed on FP Mobile Device (110). In one or more embodiments of the invention, Financial Application A (115) may be substantially the same as Financial Application B (140). In one or more embodiments of the invention, Financial Application A (115) may be a thin client. Alternatively, Financial Application A (115) may be a fat client. In one or more embodiments of the invention, Financial Application A (115) may integrate with, or use data from, other elements of FP Mobile Device (110), such as the contact list, or other applications executing on FP Mobile Device (110). In one or more embodiments of the invention, Financial Application A (115) may be in a server-client relationship with Financial Application B (140). In one or more embodiments of the invention, both applications need not be present. It will be apparent to one of ordinary skill in the art that there are many different ways to configure Financial Application A (115) and Financial Application B (140).

In one or more embodiments of the invention, Financial Application A (115) and/or Financial Application B (140) may be configured to receive a proximity distance (e.g., radius) from the user of FP Mobile Device (110). The proximity distance may be used to establish a perimeter around the mobile phone of the FP. When a client of the FP is identified as being within the perimeter (i.e., being within the proximity distance), the financial data item(s) of the client are downloaded by the FP's Mobile Device (110). In one or more embodiments of the invention, the proximity distance is set by the FP. For example, the proximity distance may be entered by the FP using the keypad of the FP Mobile Device (110). As another example, a list of proximity distances may be displayed on the FP Mobile Device (110) and the FP selects the desired proximity distance from the list. The proximity distance may be of any magnitude (e.g., 123 feet, 567 feet, 0.5 miles, etc). In one or more embodiments of the invention, there may be multiple proximity distances. For example, there may be one proximity distance if the client location corresponds to a physical address (e.g., a home or work address, etc), and another proximity distance if the client location corresponds to a mobile address (e.g., GPS location of the client's mobile device, etc). Moreover, different proximity distances may be set for different directions (e.g., 349 feet north, 781 feet south, etc.) resulting in perimeters that may be of any shape. It will be apparent to one of ordinary skill in the art that there may be many proximity distances and that the proximity distances may be of any magnitude, and, as such, the invention should not be limited to the above examples.

In one or more embodiments of the invention, the location of the client corresponds to the location of Client Mobile Device (120). In such embodiments of the invention, Client Mobile Device (120) executes a program to communicate with FP Mobile Device (110). In one or more embodiments of the invention, Client Mobile Device (120) may include a setting to opt in/out of having the location of the client tracked. In one or more embodiments of the invention, Client Mobile Device (120) provides GPS location coordinates to Financial Application A (115) or Financial Application B (140). It will be apparent to one of ordinary skill in the art that the above mentioned methods are not the only way to determine a location of a mobile device and, as such, the invention should not be limited to the above example.

In one or more embodiments of the invention, the location of the client corresponds to a physical (e.g., mailing address) address of the client of the FP, such as a home address, work address, or other address. In one or more embodiments of the invention, the physical address of the client may be stored in Financial Application A (115), Financial Application B (140), or in Client Financial Data Item(s) (135), and may have been provided by the client to the FB in the process of providing financial services. Alternatively, the physical address may have been extracted from some other source, such as a previous tax return. It will be apparent to one of ordinary skill in the art that there are many ways to determine a physical address of a client and that the invention should not be limited to the above discussed methods.

In one or more embodiments of the invention, regardless of whether the location of the client corresponds to the location of the Client Mobile Device (120) or the physical (e.g., home, work, etc.) address of the client, when the client location is identified as being within the proximity distance from FP Mobile Device (110), this triggers the Client Financial Data Item(s) (135) to be downloaded to the FP Mobile Device (110).

In one or more embodiments of the invention, Financial Institution (130) may be a bank, credit union, government, financial services provider, or any other type of institution that stores, deals with, or relates to, finances and financial data. In one or more embodiments of the invention, Financial Institution (130) may provide hardware on which Financial Application B (140) may execute. Alternatively, this may be provided by a third party. It will be apparent to one of ordinary skill in the art that there are many governmental bodies, organizations, institutions, and companies that may be a financial institution and, as such, the invention should not be limited to the above examples.

In one or more embodiments of the invention, Client Financial Data Item(s) (135) may be stored at Financial Institution (130). Alternatively, Client Financial Data Item(s) (135) may be stored at multiple different financial institutions. In one or more embodiments of the invention, Client Financial Data Item(s) (135) may be stored in the cloud. In one or more embodiments of the invention, Client Financial Data Item(s) (135) may be data provided by the client (e.g., Client (120)) to a financial professional in a prior meeting. Alternatively, Client Financial Data Item(s) (135) may include old(er) financial data such as prior tax returns, receipts, partially completed forms, or any other financial data. In one or more embodiments of the invention, some or all of Client Financial Data Item(s) (135) may be stored on FP Mobile Device (110). It will be apparent to one of ordinary skill in the art that Client Financial Data Item(s) (135) may include any information that is needed for, or helpful in, preparing any kind of financial form, application, or other document and, as such, the invention should not be limited to the above examples.

Figure 2:
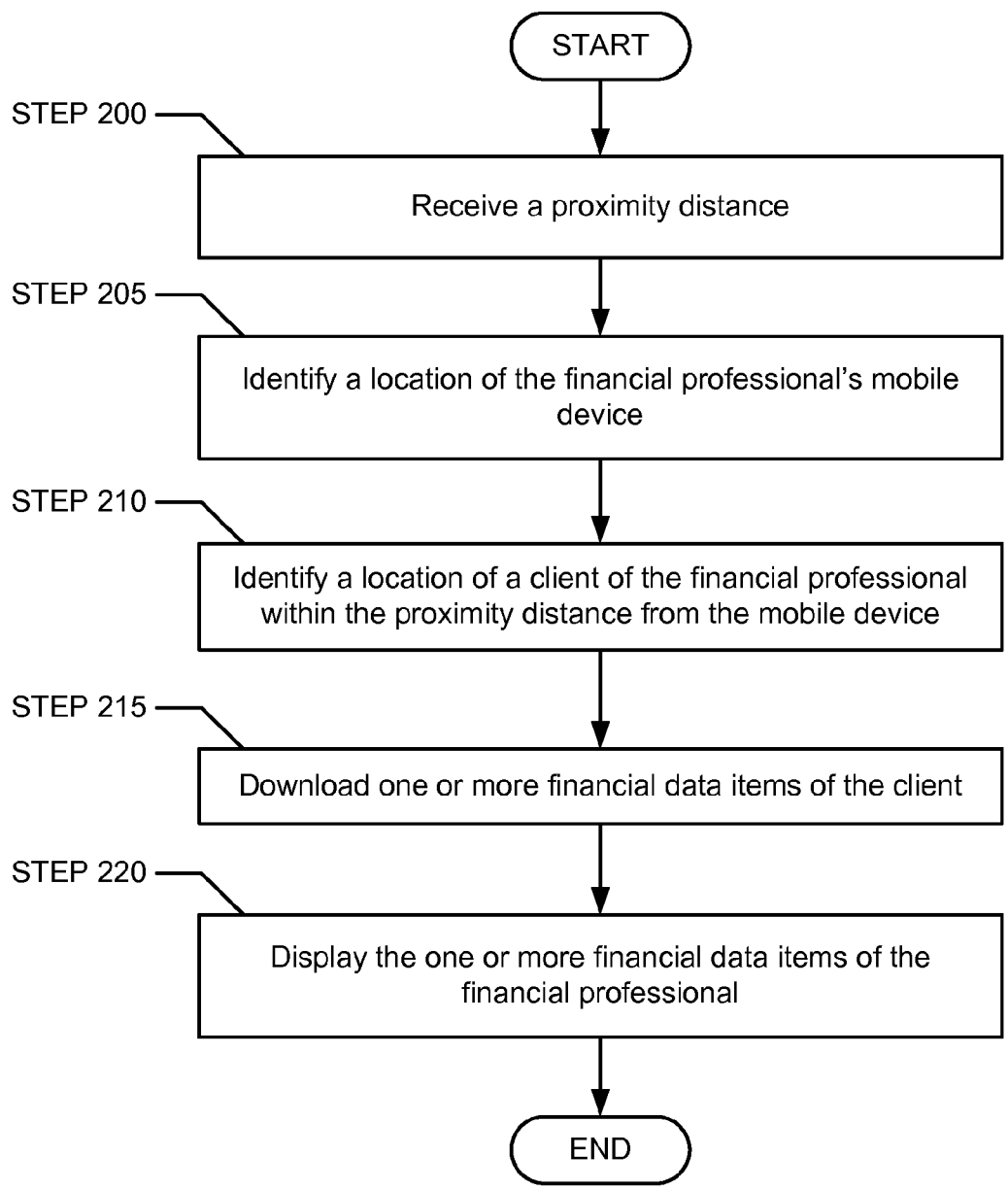
FIG. 2 shows a flowchart in accordance with one or more embodiments of the invention.

FIG. 2 shows a flowchart of a method for readying customer data based on geo-location. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, a proximity distance is received in accordance with one or more embodiments of the invention. In one or more embodiments of the invention, the request is received from a mobile device of a financial professional. Alternatively, the request may be received from another device, such as a personal computer (PC), or other suitable device. The proximity distance may be of any magnitude, as previously explained. Additionally, there may be multiple proximity distances based on whether the client location corresponds to the physical address of the client's home/work, the location of the client's mobile phone, or any other standard. For example, less important clients could be assigned a smaller proximity distance, while larger clients (i.e., based on the age or revenue derived from the FP/client relationship) could be assigned a larger proximity distance. It will be apparent to one of ordinary skill in the art that there may be any number of proximity distances (e.g., assigned to different clients) and, as such, the invention should not be limited to the above examples.

In STEP 205, the location of the FP's mobile device is identified in accordance with one or more embodiments of the invention. In one or more embodiments of the invention, this identification may be based on the GPS-coordinate of the mobile device. Alternatively, the identification may be based on some other coordinate. It will be apparent to one of ordinary skill in the art that any means, now known or later developed, of determining the location of the mobile device may be used and, as such, the invention should not be limited to the above examples.

In STEP 210, the location of a client of the FP within the proximity distance from the location of the FP's mobile device is identified in accordance with one or more embodiments of the invention. In one or more embodiments of the invention, the location of a client may be identified based on the GPS coordinates of a mobile device of the client, similar to the process in STEP 205. Alternatively, in one or more embodiments of the invention, the location of a client may be based on a physical address such as a home address, work address, or other address. It will be apparent to one of ordinary skill in the art that there are other methods to determine the location of a client and that either of the above methods, or both, may be used to identify a location of the client, and as such the invention should not be limited to the above examples. In one or more embodiments of the invention, identifying that the client is within the proximity distance may be accomplished through a simple comparison of the client data or client location to the present location of the mobile device of the FP. In one or more embodiments of the invention, this process may be done on a predetermined interval, such as every minute, or every five minutes. Alternatively, this process may be running and updating locations continuously. It will be apparent to one of ordinary skill in the art that there are many ways to determine whether the location of the client is within the proximity radius and, as such, the invention should not be limited to the above examples.

In STEP 215, one or more financial data items of the client are downloaded in accordance with one or more embodiments of the invention. In one or more embodiments of the invention, the financial data items of the client are downloaded from the cloud maintained by a financial institution, or third party. Alternatively, some of the financial data items may be downloaded directly from a mobile device of the client. In one or more embodiments of the invention, some or all of the financial data items of the client may already exist on the mobile device of the FP. In this case, only data that is not already existing may be downloaded (e.g., updates to the data), or the mobile device may merely check to ensure that the data is the most up-to-date available, and only download new information. It will be apparent to one of ordinary skill in the art that there are a variety of ways to store and/or download client financial data and, as such, the invention should not be limited to the above examples.

In STEP 220, the one or more financial data items of the client are displayed to the FP, in accordance with one or more embodiments of the invention. In one or more embodiments of the invention, the financial data may be presented as a "pop-up" on the screen of the mobile device. Alternatively, there may be a notification of some kind that the FP accesses to view the data. In one or more embodiments of the invention, the notification will let the FP know that the client financial data is now present on the mobile device and that the FP will not have to wait to access it. In one or more embodiments of the invention, only portions of the client financial data will be displayed, such as the most recently received, updated, or edited document. It will be apparent to one of ordinary skill in the art that there are many ways to present the financial data of the client to the FP and, as such, the invention should not be limited to the above examples.

The following section describes various examples of the invention. The examples are included to aid in the understanding of the invention and are not intended to limit the scope of the invention.

Figure 3A:
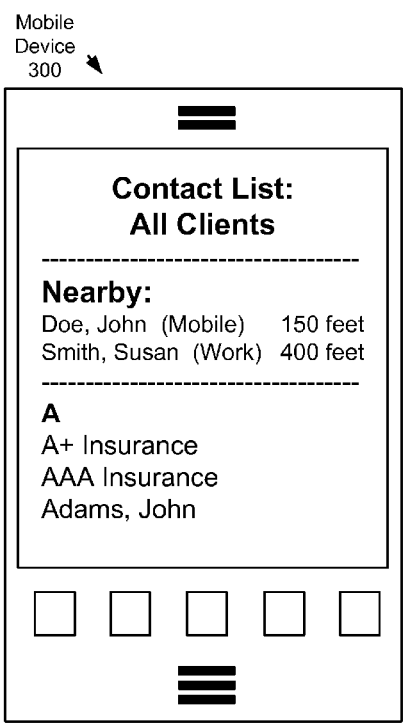
FIGS. 3A and 3B show examples in accordance with one or more embodiments of the invention.

FIG. 3A depicts an exemplary screenshot of a Mobile Device (300) (e.g., Mobile Device (110) of FIG. 1A and FIG. 1B, discussed above) of a FP. In this example, Mobile Device (300) is displaying a contact list of the FP in alphabetical order. However, there is a category before the letter "A" called "Nearby." The "Nearby" list shows which contacts, if any, are close by. In this example, the "Nearby" list is showing that John Doe is 150 feet away on his mobile device, and Susan Smith's workplace is 400 feet away. John Doe and Susan Smith are both clients of the FP operating the Mobile Device (300). In one or more embodiments of the invention, the "Nearby" list could be identify any client located within the proximity distance. Alternatively, the "Nearby" list may have a larger distance than the proximity distance. The example continues in FIG. 3B.

Figure 3B:
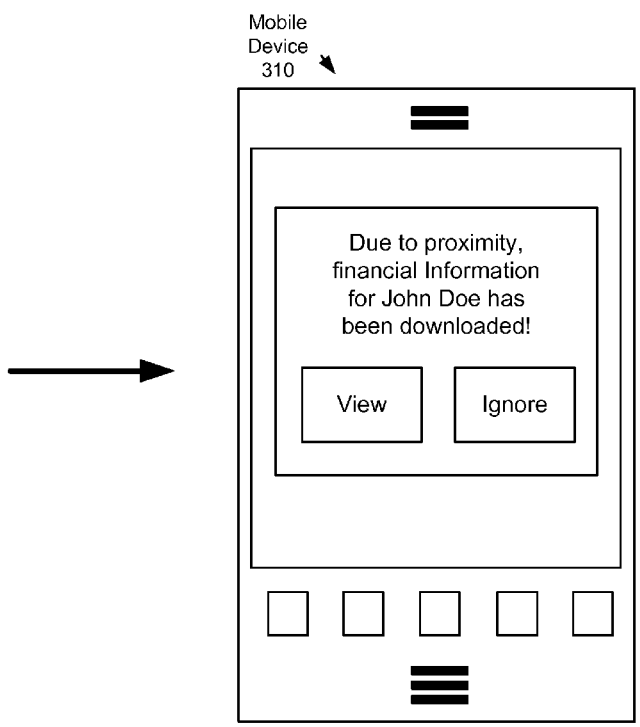

In FIG. 3B, Mobile Device (310) is displaying a notification that John Doe's financial data item(s) have been downloaded, due to John Doe's proximity. The FP operating the Mobile Device (310) can either view the financial data item(s) or ignore the notification. This financial data item(s) were automatically downloaded by the application—the FP did not need to execute any additional steps to instruct the application to download the financial data item(s) of John Doe. This allows the FP to access client-specific data items with no prior knowledge of a meeting with a client. Further, it prevents delays due to slow download speeds because the download will have started before the FP will need the financial data items. It will be apparent to one of ordinary skill in the art that there are many ways to display information and as such, the invention should not be limited to the above example. In this example, the proximity distance is set somewhere between 150 and 400 feet. However, any amount may be used for the proximity distance. Additionally, in one or more embodiments of the invention, there may be separate proximity distances based on the type of location (i.e., mobile device, home address, work address, etc).

Figure 4:
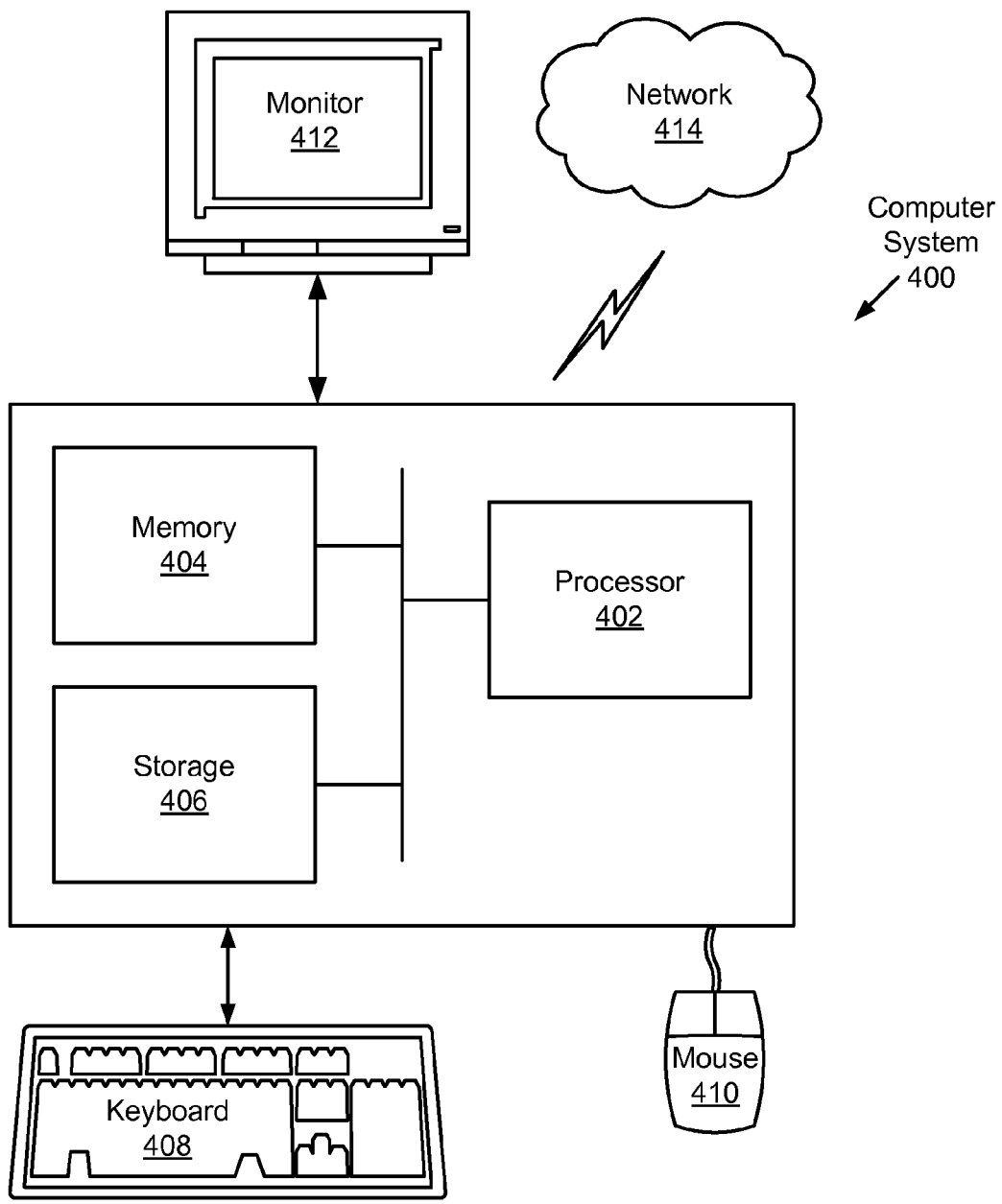
FIG. 4 shows a computer system in accordance with one or more embodiments of the invention.

Embodiments of the invention may be implemented on virtually any type of computer regardless of the platform being used. For example, as shown in FIG. 4, a Computer System (400) includes one or more Processor(s) (402) (such as a central processing unit (CPU), integrated circuit, hardware processor, etc.), associated Memory (404) (e.g., RAM, cache memory, flash memory, etc.), a Storage Device (406) (e.g., a hard disk, an optical drive such as a compact disk drive or digital video disk (DVD) drive, a flash memory stick, etc.), and numerous other elements and functionalities typical of today's computers (not shown). The Computer System (400) may also include input means, such as a Keyboard (408), a Mouse (410), or a microphone (not shown). Further, the Computer System (400) may include output means, such as a Monitor (412) (e.g., a liquid crystal display (LCD), a plasma display, or cathode ray tube (CRT) monitor). The Computer System (400) may be connected to a Network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the Computer System (400) includes at least the minimal processing, input, and/or output means necessary to practice embodiments of the invention.

Further, in one or more embodiments of the invention, one or more elements of the aforementioned Computer System (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for readying client financial data, comprising:
receiving a proximity distance;
identifying, using a Global Positioning System (GPS) of a first mobile device of a financial professional (FP), a first location of the first mobile device;
receiving, at the first mobile device, first GPS coordinates sent from a second mobile device used by a first client of the FP;
using the received first GPS coordinates, identifying a first location of the second mobile device;
executing, using a processor of the first mobile device, a first determination that a first distance between the first location of the first mobile device and the first location of the second mobile device exceeds the proximity distance;
identifying, using the GPS of the first mobile device, a second location of the first mobile device;
receiving, at the first mobile device, second GPS coordinates sent from the second mobile device;
using the received second GPS coordinates, identifying a second location of the second mobile device;
executing, using the processor of the first mobile device, a second determination that a second distance between the second location of the first mobile device and the second location of the second mobile device is within the proximity distance;
downloading, by the first mobile device of the FP and in response to identifying the second mobile device used by the first client within the proximity distance, a first financial data item corresponding to the first client, the first financial data item downloaded from a server connected to the first mobile device of the FP by a wireless network; and
displaying, to the FP by the first mobile device of the FP, the first financial data item.

2. The method of claim 1, further comprising:
identifying a location of a second client of the FP within the proximity distance from the second location of the first mobile device;
downloading, by the first mobile device of the FP and in response to identifying the location of the second client, a second financial data item corresponding to the second client; and
displaying, to the FP by the first mobile device of the FP, the second financial data item.

3. The method of claim 2, wherein downloading the second financial data item occurs before downloading the first financial data item when the location of the second client is closer to the second location of the first mobile device of the FP than the second location of the second mobile device used by the first client.

4. The method of claim 2, wherein the location of the second client corresponds to a home of the second client.

5. The method of claim 1, wherein the first financial data item is an e-filing tax return acceptance.

6. The method of claim 1, wherein the FP is a professional tax preparer.

7. A system for readying client financial data, comprising:
a first mobile device of a financial professional (FP); and
a financial application executing on the first mobile device of the FP and configured to:
receive a proximity distance;
identify, using a Global Positioning System (GPS) of the first mobile device of the FP, a first location of the first mobile device;

receive, at the first mobile device, first GPS coordinates sent from a second mobile device used by a first client of the FP;

using the received first GPS coordinates, identify a first location of the second mobile device;

execute, using a processor of the first mobile device, a first determination that a first distance between the first location of the first mobile device and the first location of the second mobile device exceeds the proximity distance;

identify, using the GPS of the first mobile device, a second location of the first mobile device;

receive, at the first mobile device, second GPS coordinates sent from the second mobile device;

using the received second GPS coordinates, identify a second location of the second mobile device;

execute, using the processor of the first mobile device, a second determination that a second distance between the second location of the first mobile device and the second location of the second mobile device is within the proximity distance;

download, in response to identifying the second mobile device used by the first client within the proximity distance, a first financial data item corresponding to the first client, the first financial data item downloaded from a server connected to the first mobile device of the FP by a wireless network; and display, to the FP, the first financial data.

8. The system of claim 7, wherein the financial application is further configured to:

identify a location of a second client of the FP within the proximity distance from the second location of the first mobile device of the FP;

download, in response to identifying the location of the second client, a second financial data item corresponding to the second client; and display, to the FP, the second financial data.

9. The system of claim 8, wherein the financial application is further configured to download the second financial data item before the first financial data item is downloaded when the location of the second client is closer to the second location of the first mobile device of the FP than the second location of the second mobile device used by the first client.

10. The system of claim 7, wherein the proximity distance is 2.5 miles.

11. The system of claim 8, wherein the location of the second client corresponds to a home address of the second client.

12. The system of claim 7, wherein the first financial data item is an e-filing tax return acceptance.

13. The system of claim 7, wherein the FP is a professional tax preparer.

14. A non-transitory computer-readable medium (CRM) storing a plurality of instructions for readying client financial data, the plurality of instructions comprising functionality to:

receive a proximity distance;

identify, using a Global Positioning System (GPS) of a first mobile device of a financial professional (FP), a first location of the first mobile device;

receive, at the first mobile device, first GPS coordinates sent from a second mobile device used by a first client of the FP;

using the received first GPS coordinates, identify a first location of the second mobile device;

execute, using a processor of the first mobile device, a first determination that a first distance between the first location of the first mobile device and the first location of the second mobile device exceeds the proximity distance;

identify, using the GPS of the first mobile device, a second location of the first mobile device;

receive, at the first mobile device, second GPS coordinates sent from the second mobile device;

using the received second GPS coordinates, identify a second location of the second mobile device;

execute, using the processor of the first mobile device, a second determination that a second distance between the second location of the first mobile device and the second location of the second mobile device is within the proximity distance;

download, by the first mobile device of the FP and in response to identifying the location of the second mobile device used by the first client within the proximity, a first financial data item corresponding to the first client, the first financial data item downloaded from a server connected to the first mobile device of the FP by a wireless network; and display, to the FP, the first financial data.

15. The non-transitory CRM of claim 14, wherein the instructions further comprise functionality to:

identify a location of a second client of the FP located within the proximity distance of the second location of the first mobile device of the FP;

download, in response to identifying the location of the second client, a second financial data item corresponding to the second client; and display, to the FP, the second financial data.

16. The non-transitory CRM of claim 15, wherein the instructions further comprise functionality to download the second financial data item before the first financial data item is downloaded when the location of the second client is closer to the second location of the first mobile device of the FP than the second location of the second mobile device used by the first client.

17. The non-transitory CRM of claim 14, wherein the proximity distance is 2.5 miles.

18. The non-transitory CRM of claim 15, wherein the location of the second client corresponds to a home address of the second client.

19. The non-transitory CRM of claim 14, wherein the first financial item data is an e-filing tax return acceptance.

* * * * *